(12) United States Patent
Rowen et al.

(10) Patent No.: US 8,885,894 B2
(45) Date of Patent: Nov. 11, 2014

(54) REDUCTION OF TRANSACTION FRAUD THROUGH THE USE OF AUTOMATIC CENTRALIZED SIGNATURE/SIGN VERIFICATION COMBINED WITH CREDIT AND FRAUD SCORING DURING REAL-TIME PAYMENT CARD AUTHORIZATION PROCESSES

(76) Inventors: Michael John Rowen, Oakton, VA (US); Rodney Beatson, Pittsboro, NC (US); Mark A. Kelty, Cantonsville, MD (US)

( * ) Notice: Subject to any disclaimer, the term of this patent is extended or adjusted under 35 U.S.C. 154(b) by 901 days.

(21) Appl. No.: 13/072,398

(22) Filed: Mar. 25, 2011

(65) Prior Publication Data

US 2011/0238510 A1    Sep. 29, 2011

Related U.S. Application Data

(63) Continuation-in-part of application No. 12/627,413, filed on Nov. 30, 2009, now Pat. No. 7,916,907, which is a continuation of application No. 11/151,412, filed on Jun. 14, 2005, now abandoned.

(60) Provisional application No. 60/579,422, filed on Jun. 14, 2004, provisional application No. 61/389,208, filed on Oct. 2, 2010.

(51) Int. Cl.
| | |
|---|---|
| *G06K 9/00* | (2006.01) |
| *G06Q 20/40* | (2012.01) |
| *G06Q 20/10* | (2012.01) |
| *G06K 9/32* | (2006.01) |
| *G06Q 20/20* | (2012.01) |
| *G07C 9/00* | (2006.01) |

(52) U.S. Cl.
CPC ...... *G06K 9/00187* (2013.01); *G06Q 20/40145* (2013.01); *G06Q 20/10* (2013.01); *G06K 9/3283* (2013.01); *G06Q 20/1085* (2013.01); *G06Q 20/20* (2013.01); *G06Q 20/4016* (2013.01); *G07C 9/00087* (2013.01)
USPC .............................. 382/119; 705/1.1; 705/16

(58) Field of Classification Search
USPC ...................................... 382/119; 705/1.1, 16
See application file for complete search history.

(56) References Cited

U.S. PATENT DOCUMENTS

| | | | |
|---|---|---|---|
| 5,544,255 A | 8/1996 | Smithies et al. |
| 5,559,895 A | 9/1996 | Lee |
| 5,647,017 A | 7/1997 | Smithies et al. |
| 5,680,470 A | 10/1997 | Moussa et al. |
| 5,818,955 A | 10/1998 | Smithies et al. |
| 5,892,824 A | 4/1999 | Beatson et al. |
| 5,910,988 A | 6/1999 | Ballard |
| 6,032,137 A | 2/2000 | Ballard |
| 6,064,751 A | 5/2000 | Smithies et al. |

(Continued)

*Primary Examiner* — Matthew Bella
*Assistant Examiner* — Julian Brooks

(57) ABSTRACT

A dynamic signature/sign biometric verification system for detecting and preventing fraudulent transactions is described. The system comprises remote digital signature/sign input devices, a means to extract spatial and temporal features from the signature, a means to transmit the signature/sign features along with customer identifier information to a centralized signature/sign verification authority, a means for combining signature/sign feature verification with other forms of fraud detection technology, and a means for transmitting the results of a signature/sign verification back to the remote location where the signature/sign was captured. The system was primarily developed for use in payment card industries (e.g. credit cards, debit cards) but has applicability to other centralized signature/sign verification applications such as Automated Teller Machine authorizations and other identity theft detection and monitoring services.

20 Claims, 4 Drawing Sheets

(56) References Cited

U.S. PATENT DOCUMENTS

| | | | |
|---|---|---|---|
| 6,091,835 A | 7/2000 | Smithies et al. | |
| 6,539,363 B1 | 3/2003 | Allgeier et al. | |
| 6,715,672 B1 | 4/2004 | Tetro | |
| 6,836,554 B1 | 12/2004 | Bolle | |
| 6,853,987 B1 | 2/2005 | Cook | |
| 6,873,715 B2 | 3/2005 | Kuo | |
| 7,120,607 B2 | 10/2006 | Bolle | |
| 7,136,841 B2 | 11/2006 | Cook | |
| 7,263,506 B2* | 8/2007 | Lee et al. | 705/38 |
| 7,389,269 B1 | 6/2008 | Robinson | |
| 7,451,481 B2 | 11/2008 | Bauer | |
| 7,522,060 B1 | 4/2009 | Tumperi | |
| 7,545,960 B2 | 6/2009 | Coutts | |
| 7,604,169 B2 | 10/2009 | Demere | |
| 7,775,440 B2 | 8/2010 | Silverbrook et al. | |
| 7,792,286 B2 | 9/2010 | Futa et al. | |
| 7,793,106 B2 | 9/2010 | Bugbee | |
| 7,797,549 B2 | 9/2010 | Main et al. | |
| 7,801,828 B2 | 9/2010 | Candella et al. | |
| 2002/0138351 A1* | 9/2002 | Houvener et al. | 705/18 |
| 2005/0071283 A1* | 3/2005 | Randle et al. | 705/75 |
| 2005/0097037 A1* | 5/2005 | Tibor | 705/39 |
| 2008/0046747 A1* | 2/2008 | Brown et al. | 713/182 |
| 2008/0075333 A1* | 3/2008 | Ericson et al. | 382/116 |
| 2010/0082490 A1 | 4/2010 | Rosenblatt et al. | |

* cited by examiner

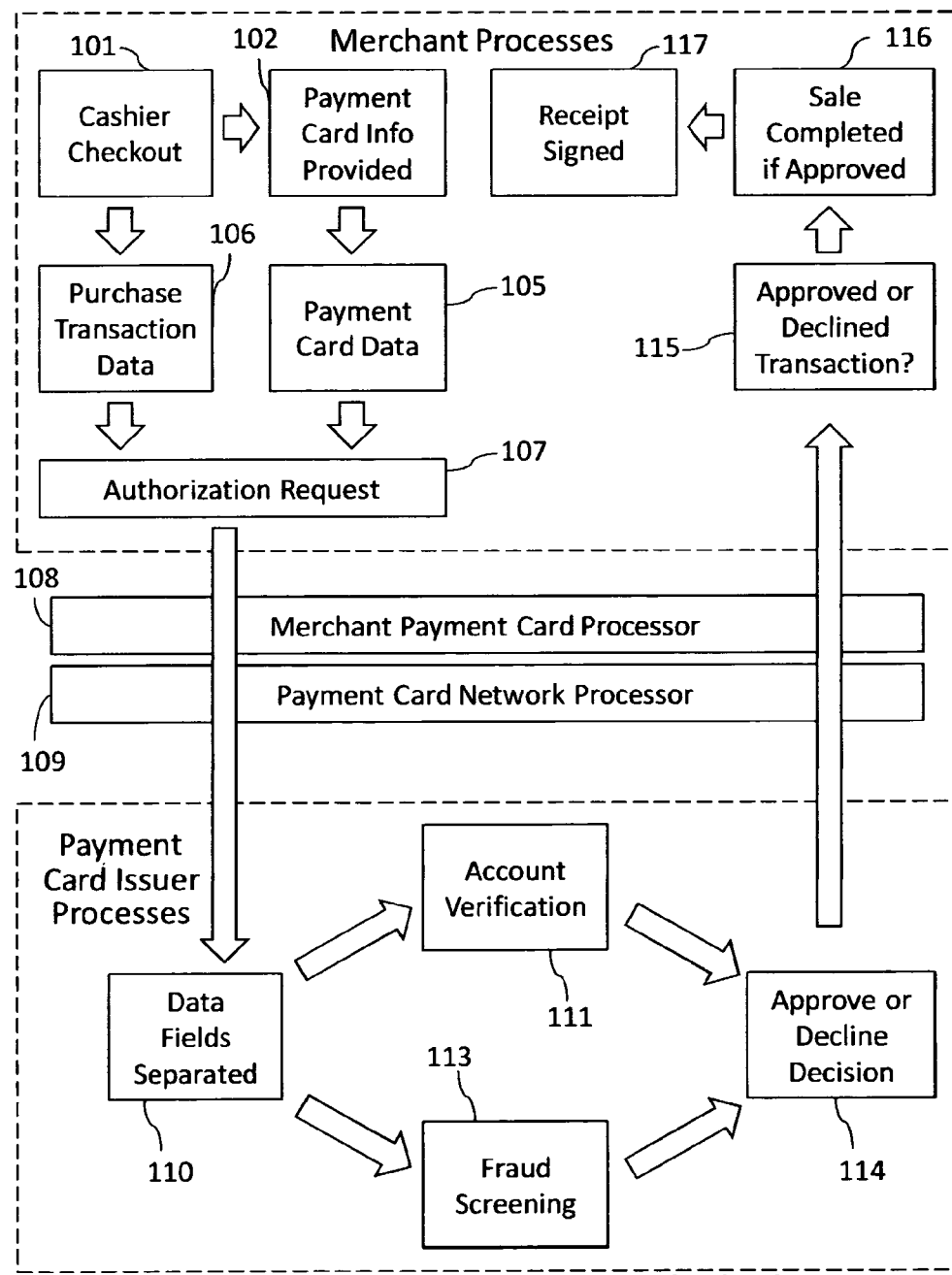
Figure 1: Current Payment Card Industry Authorization Process

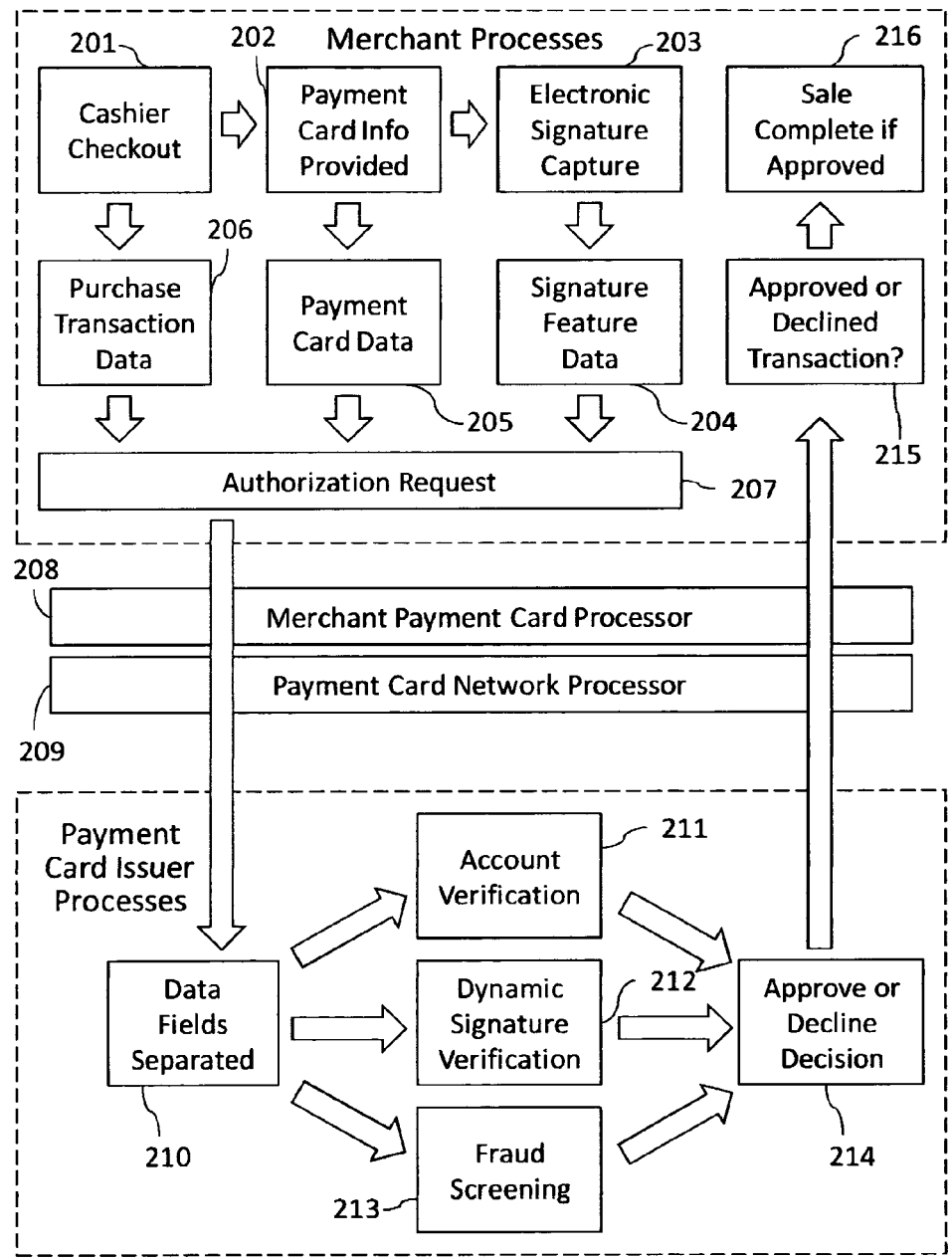
Figure 2: Preferred Embodiment of the Invention

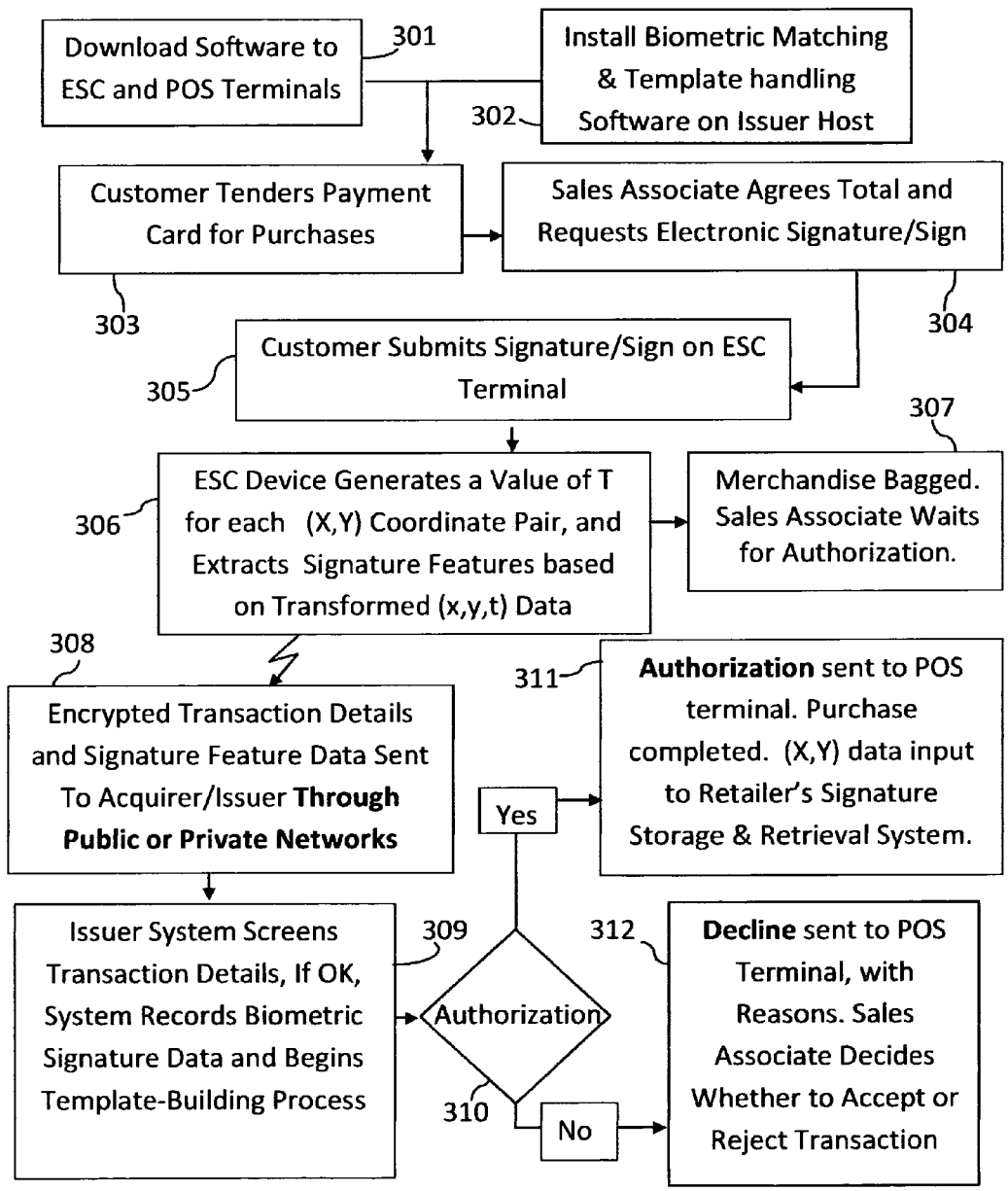
Figure 3: Initial Transactions to Establish Template at Issuer Host

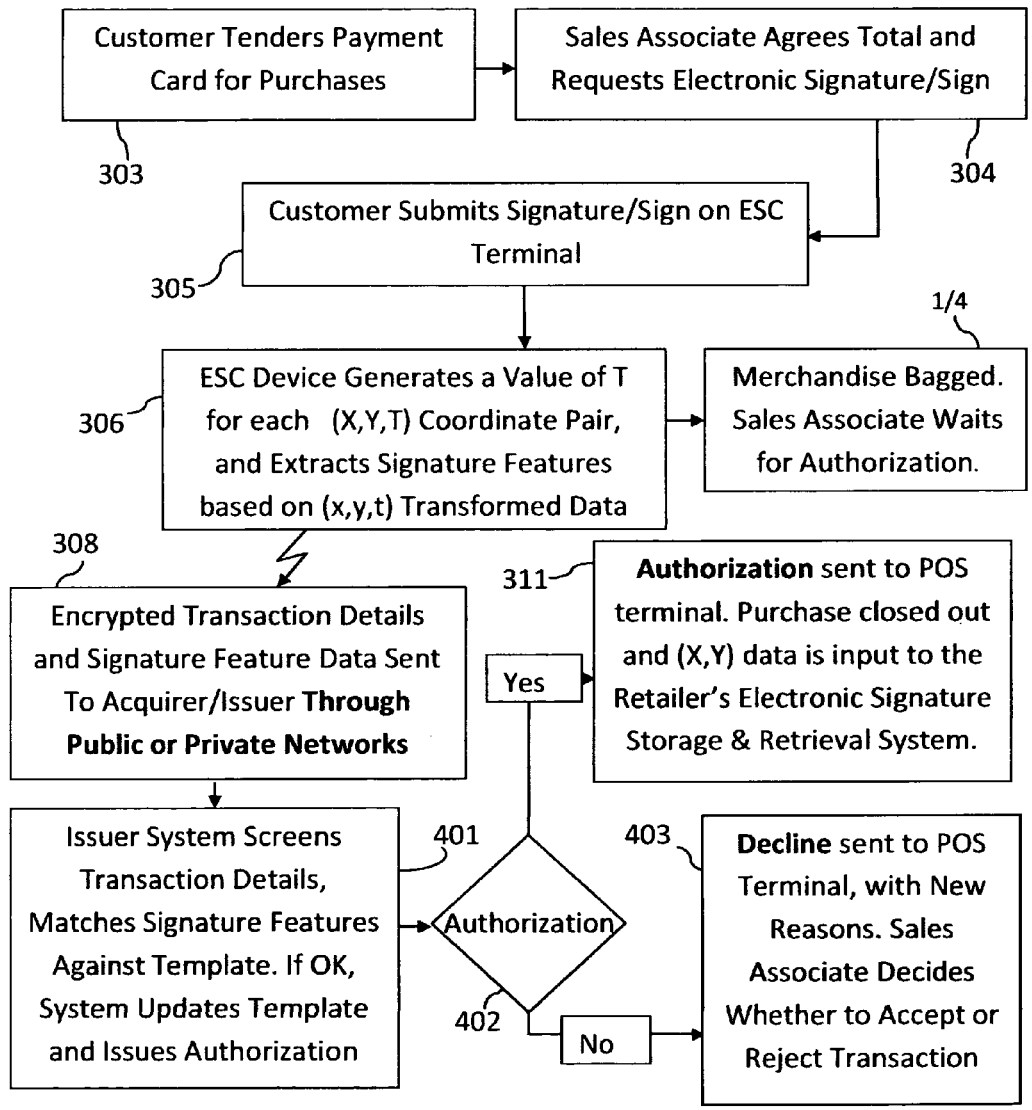
Figure 4: Later Transactions at POS After Template Building

REDUCTION OF TRANSACTION FRAUD THROUGH THE USE OF AUTOMATIC CENTRALIZED SIGNATURE/SIGN VERIFICATION COMBINED WITH CREDIT AND FRAUD SCORING DURING REAL-TIME PAYMENT CARD AUTHORIZATION PROCESSES

CROSS-REFERENCE TO RELATED APPLICATIONS

This application is a Continuation-In-Part of U.S. patent application Ser. No. 12/627,413, filed 30 Nov. 2009 now U.S. Pat. No.7,916,907, which in turn was a Continuation of U.S. patent application Ser. No. 11/151,412, filed 14 Jun. 2005 (now abandoned), which is based on U.S. Provisional Patent Application No. 60/579,422 filed 14 Jun. 2004. The Application is also based on Provisional Patent Application 61/389,208 filed on Oct. 2, 2010.

STATEMENT REGARDING FEDERALLY SPONSORED RESEARCH OR DEVELOPMENT

This invention was funded by the named inventors with no federally sponsored funding.

BACKGROUND OF THE INVENTION

Fraudulent use of payment cards (i.e. credit cards and debit cards) cost the U.S. payment card industry billions of dollars in financial losses annually. Given the size of this expense, there are numerous technologies and techniques that have evolved or been developed to help reduce fraudulent transactions. The present invention relates to the field of real-time fraud prevention and identification technologies.

Evolution of Fraud Prevention in the Payment Card Industry: Fraudulent charges in the U.S. payment card industry are approximately 7 bp, or 0.07%, of the $1.5 trillion in purchases made annually using payment cards such as credit cards and debit cards. Costing roughly $1 billion annually, combating the fraudulent use of payment cards has been a significant priority for the industry since its inception in the 1950's. Additionally, the cost to customers is also not included in this figure as identify theft is a particularly insidious form of fraud that can literally cause financial hardship, relationship issues, and/or emotional problems for people who are victims of identity theft.

Outside of the United States, fraudulent transactions are a much larger problem for the payment card industry as few countries in the world have developed the sophisticated real-time card processing and fraud screening capabilities that the US market utilizes. As a result, many countries have yet to evolve a significant payment card industry as the significant costs of fraud have prevented widespread penetration of card purchasing products.

Early industry fraud prevention relied on checking each payment card number against a known list of corrupted card numbers contained in an ever growing booklet distributed weekly to every merchant who accepted payment cards. The 1980's ushered in a major break-through in fraud prevention with the advent of real-time authorization, whereby merchants could dial-up their payment card processor and electronically compare a payment card with card numbers on the corrupted list in seconds, thereby eliminating the need to manually check industry booklets while including up-to-the-minute identified corrupted cards in real-time.

The current state-of-the-art in payment card fraud prevention evolved during the 1990's as sophisticated neural networks began to be utilized to screen transactions for more than just corrupted account numbers.

Current State-Of-The-Art Payment Card Industry Fraud Prevention: Neural networks are the backbone of both merchant and industry fraud defenses today. These are highly sophisticated computer programs that continuously scan the transaction data of known fraudulent transactions, in search of patterns that can be used to screen new transactions in real-time, with the hopes of identifying and declining fraudulent transactions at the point of sale.

An example of a neural network pattern that has a high probability of stopping a fraudulent transaction is an unusually small purchase at an automated gas station kiosk pump followed by a large dollar purchase at a nearby store. In this scenario, neural network pattern recognition has discovered that criminals intent on using stolen payment cards frequently use them at gas station automated pumps first, where they do not have to physically swipe the card in front of another human being. Once the criminal sees that the transaction is approved, they typically pump little or no gas into the car and head off to a local store to make a large purchase while the card is still in good standing. Another example is a sequence of purchases that are unusually high relative to a customers normal spending pattern, or a large purchase at a very high end retailer by a customer who has previously only shopped at discount retailers. By rigorously and continuously scanning prior known fraud case transaction histories, the industry has built up a large number of patterns that have been empirically shown to have a high correlation with fraudulent transactions.

Issuer neural networks score every purchase authorization request in real-time for the probability of being fraudulent based on a set of pre-determined rules applied to known fraud transaction patterns. If the fraud score is below a low threshold, the transaction is automatically approved provided the customer is in good standing and has sufficient funds available for the purchase. If the fraud score is above a high threshold, the transaction is automatically declined as almost definitely fraudulent. If the fraud score is between the high and low thresholds, the transaction is escalated to a fraud specialist who makes a judgment call on whether or not to approve the transaction based on the transaction patterns and the customers history.

The present inventors believe that this is where the present invention can be applied to dramatically reduce industry fraud costs. By adding signature feature extraction analysis to the fraud screening process, the inventors believe that more fraudulent transactions can be identified and automatically declined, and that more legitimate transactions can be automatically approved, thereby reducing both the incidence of fraud as well as reducing the costs of escalating to a human fraud specialist.

Fraud Investigators: Payment card issuing banks have a well trained staff of fraud specialist investigators. While some of these investigators focus on supporting the real-time authorization process in an effort to decline suspected fraudulent transactions at the point-of-sale, others investigate cases of suspected fraud after transactions have been approved and the funds have been deployed to the merchant A typical fraud investigation would be initiated when a customer receives a credit card bill and notices several transactions that they did not authorize. They call or write to their payment card issuer and report these transactions as fraudulent. A fraud specialist investigates the transaction with the goal of identifying the fraud perpetrator in order to recover the stolen money.

An investigator may suspect, based on the nature of the fraudulent transaction, that the customer may know who or how the unauthorized transactions occurred. In this situation, they may request that the customer file a police report, and then fax a copy of the report to the investigator before credit for the unauthorized transactions are issued to the account. In this scenario, the fraud specialist may be suspecting that a relative or friend of the customer "borrowed" the card and made the unauthorized purchases. Teenage and adult children living with their parents have frequently been shown to borrow a parent's card and make unauthorized purchases. When the bill comes, the parent notices the charges and notifies their card issuing bank about the unauthorized charges, with a goal of not wanting to pay for their child's purchases. However, when a fraud investigator requests a police report, a parent often decides to simply pay for the charges rather than risk a police investigation concluding that their child committed fraud. An example of a transaction pattern that would lead a fraud specialist to request a police report would be a few purchases on a single day at a local store near the customer's home address, followed by no additional disputed charges. A truly stolen card typically continues to incur fraudulent transactions until the card account was dosed, while a borrowed card typically incurs unauthorized charges for a brief period of time. It is the belief of the inventors that the present invention would reduce the incidence of this form of fraud by potentially declining all purchases on borrowed cards as it is much more difficult for a person to accurately forge a signature that would pass a feature set comparison including a time dimension, than it would be to visually forge a signature Verification of additional customer data: Other fraud defenses used by the industry include capturing additional information from the customer during the transaction with the intent of trying to authenticate that the person making the transaction is indeed the customer, and/or that the purchaser in fact is in physical possession of the customer's card. The most prevalent example of data currently being used to authenticate a customer during a transaction is the Personal Identification Number, or PIN, associated with a debit card. This is typically a 4 digit code that is either selected by the customer or created by the card issuing bank and given to the customer. By swiping a card through a merchant POS terminal, and then by the customer entering a unique PIN code, the amount of fraud incurred in PIN debit transactions is substantially lower than that incurred in all other card transactions.

The other significant data verification technique currently being used by the payment card industry is the three digit code on the back of Visa or MasterCard branded cards, or the 4 digit code on the front of an American Express branded card, which are known in the industry as "Card Verification Value 2" or "CVV2" codes. CVV1 codes are security codes that are stored on the magnetic strip of payment cards and are used to verify card present transaction treatment. CVV2 codes are the 3 or 4 digit codes printed on the surface of the physical cards. Neither PINs nor CVV2 codes are contained on the magnetic strips, and they are not allowed to be retained in a merchant's system, whereas CVV1 codes are allowed to be stored in a merchant's system for ease of issuing refunds. The fact that card account number and CVV1 data is regularly stored in merchant systems has led to a number of security breaches whereby people intent on committing fraud will "hack" into a merchants systems and steal hundreds of thousands, or even millions of card numbers in one attack. These stolen card numbers are then sold or used quickly before the theft is discovered. The knowledge that a card number may have been stolen in a merchant hacking incident is another example of information used by the neural networks in detecting possible fraud.

The primary goal of any additional customer information captured is to use data that is isolated from the magnetic strip and any data stored in merchant systems. This has led the industry to be fairly effective in limiting fraud costs when approving PIN and CVV2 transactions. It is the opinion of the inventors that by using the present invention instead of these codes, or perhaps in addition to these codes, that fraud costs can be further reduced since codes can be stolen and utilized in transactions much more easily than signature biometrics, which are extremely difficult to replicate during a card present real world transaction.

Current State-Of-The-Art Payment Card Industry Online Fraud Prevention: In online transactions, a physical swipe of a payment card and a signature verification check have not hitherto been possible. These transactions are known in the industry as "Card Not Present", and represent a much higher incidence of fraud (although a smaller value) than transactions that occur in real-world POS merchant locations. There have been numerous technologies and techniques experimented with by the industry. An example of one such technology is known as "Verified by Visa" or "VBV". This was an optional checkout screen created by Visa for online merchants who wished to lower their fraud costs by allowing customers to log into their credit card accounts during the checkout process to authorize their transactions. By using VBV during checkout, merchants were granted the equivalent treatment of a card present transaction by the payment card industry, thereby shifting any fraud losses associated with an approved transaction from the merchant to the card issuing bank. While many online merchants attempted to use VBV, the ultimate penetration of the technology has been hampered by it being optional for consumers to use it at the checkout It also required additional checkout screens and time for the customer, which resulted in higher rates of shopping cart abandonment, causing merchants who adopted VBV to lose sales that they otherwise would have completed. To the consumer, VBV was an optional process that required more time to use and didn't provide tangible additional benefits, and so adoption of this technology has been slow.

Smart cards have also effectively reduced fraud in countries that lack a real-time authorization infrastructure. In these countries, PIN input is required by the customer in order for the chip on the smart card to release the card owner's name and card number to the POS terminal. Thus smart card enabled merchants render any stolen smart card worthless to the person intent on committing fraud, unless they are able to steal the associated PIN along with the stolen smart card. Several attempts have been made to market smart cards in the USA, most notably the launch of the American Express "Blue" card in the early 2000's. This card was marketed as providing more security for the customer due to the need for a PIN to make a transaction via a smart card terminal.

While in theory smart cards might be able to be used to reduce fraud, the fact that the Blue card can also be swiped in a standard POS terminal without using the smart card chip or PIN, renders the technology worthless as a fraud defense since the more secure process is "optional" as is the case with VBV. For this reason, the industry has struggled to modify transaction authorization processes that would reduce fraud further, instead opting to make the primary defense for fighting fraud the neural networks coupled with highly trained fraud specialists.

Very recently a system of associating mobile phones (using the phone number) with a specific credit card and using the phone instead of the card as the identifying credential has been proposed. The authenticating device is a chip inside the phone which communicates contactlessly with a reader at the POS location. The inventors believe that this system will remain susceptible to fraudulent use because the customer is not being authenticated, only the customer's phone is authenticated, thus stolen or lost phones could be easily used to make purchases without the need for the purchaser to sign any receipts. The present invention could be used in conjunction with these types of mobile payment systems to capture the purchaser's signature using a finger or stylus on the mobile phone to generate feature extraction data to be associated with the transaction and checked against the remote template by the payment card issuer.

The inventors believe that by capturing computer pointing device-generated purchaser signatures, and combining signature verification with existing state of the art fraud screening techniques, that online payment card fraud can be dramatically reduced. The unique advantages of the present invention over other systems that have attempted to reduce online fraud are multiple: (1) the present invention mirrors real world checkout processes in that presenting payment card information and signing a receipt are required to complete a purchase; (2) No additional screens are required during on-line checkout, minimizing any adverse impact to merchants of higher levels of shopping cart abandonment and (3) consumers do not need any additional computer hardware nor do they need to remember any additional passwords to complete a purchase.

DESCRIPTION OF PRIOR ART

While there were many art references researched by the inventors in ensuring that the present invention is novel, the following art was identified as more closely related to the present invention, and thus the inventors deemed it worthwhile to discuss them in more detail as they relate to the present invention.

U.S. Pat. No. 6,873,715 (Kuo) System of central signature verifications & electronic receipt transmissions.

This system takes a photograph of the signature on the back of a payment card and displays the photograph on a screen to make it easier for a cashier at the merchant location to compare the receipt signature with the payment card signature. The present invention is uniquely different from this art in two fundamental ways: (1) performing the signature verification remotely at the payment card issuing bank location, as opposed to the merchant location, and (2) performing an automatic electronic signature verification as opposed to a visual verification.

U.S. Pat. Nos. 7,136,841 and 6,853,987 (Cook) Centralized authorization & fraud-prevention system for network-based transactions These systems capture a signature "phrase" from a customer in an electronic commerce transaction as an added layer of fraud protection. A signature phrase is essentially the same as a Personal Identification Number (PIN) as used in debit cards, or a password as used in the Verified By Visa system. The present invention electronically captures a purchaser's actual signature (or sign) as opposed to a signature phrase, and extracts relevant biometric features from the actual signature that are used to perform a highly accurate automated signature verification function as opposed to a simple phrase or password verification.

U.S. Pat. No. 5,559,895 (Lee et al) Adaptive method and system for real time verification of dynamic human signatures This art utilizes a personal computer that is "locally owned and operated" by a merchant to perform signature verification locally at a Point-Of-Sale location, whereas the present invention utilizes a "remotely located" computer, that is "independently owned and operated" by an entity other than the merchant (i.e. the payment card issuing bank) to perform signature verification. This demonstrates that the signature verification process might help the retail merchant but is of no help in satisfying the authorization request process. While none of its claims specifically address a remotely operated or independently owned computer to perform signature verification, one sentence in the body of this patent discusses an alternate configuration where the computer performing the signature verification can be remotely located across a network as a way to verify Automated Teller Machine (ATM) transactions for a bank. In this alternate embodiment, the computer would still be owned and operated by the entity capturing the signature (i.e. the bank that owns the ATM network). While the present inventors know of no ATM machines that exist today that capture signatures (i.e. they all use RN's to verify identity), this embodiment appears to be an attempt to broaden the scope of it's invention in an unspecific manner. A further differentiating aspect of the present invention is that this system does not rotate the signature prior to analyzing and comparing it to the biometric signature template. Initial data rotation to a consistent angle of inclination, as the present invention advocates, greatly improves the signature/template comparison and makes for a much more accurate determination of authenticity.

Patent Application # 20020138351 (Houvener et al) Positive identification system and method.

This system involves retrieving previously stored personal identification information from a remote database, and comparing the remotely retrieved personal information with the same information captured at a Point-Of-Sale location to verify a purchasers identity. The present invention is substantially different from this system in that rather than retrieving additional information from a remote database to verify purchaser identity at a Point-Of-Sale location, the present invention captures additional information at the Point-Of-Sale, namely biometric signature/sign feature data and transmits this additional information to the payment card issuer so the purchasers identify can be verified automatically at a remote location.

U.S. Pat. Not. 7,120,607 (Bolle) Business system and method using a distorted biometrics U.S. Pat. No. 6,836,554 (Bolle) System & method for distorting biometric for transactions with enhanced security/privacy.

These systems both rely on the capture of biometric information at a location, and then intentionally distorting one or more aspects of the biometric information before transmitting that distorted information to a remote location for comparison to previously stored copies of the distorted biometric information. These systems also rely upon an unchanging biometric modality and the signature/sign modality is behavioral and therefore constantly changing and changeable. The present invention does not intentionally nor unintentionally distort any aspect of the signature(sign) captured, but instead, extracts un-distorted features of the signature from an originally captured set of signature points, representative of the signature, from a signature entry terminal and transmits the extracted features to a remote location for identity verification against a signature template created from previous undistorted samples.

U.S. Pat. No. 6,715,672 (retro) System & method for enhanced fraud detection in automated electronic credit card processing.

This system captures payment card number, purchaser name and address, and a portion of a uniquely identifying piece of information about the purchaser. The payment card authorization request information is transmitted to the payment card issuing bank, while the name, address, and uniquely identifying information is compared to similar information stored in a second independent database. If the payment card issuing bank authorizes the transaction, and the second independent database verifies the purchaser's identity, then the merchant goes ahead with the transaction so the uniquely identifying information is used by the merchant rather than the issuer to authorize the transaction. The present invention is substantially different to this system in that the signature verification is coupled with the payment card authorization request information and a single authorization is provided to the merchant Point-Of-Sale location. Also, the present invention does not require nor capture the purchaser's name and address information, and it does not require nor utilize a third party database for identity verification purposes.

U.S. Pat. No. 5,892,824 (Beatson et al) Signature Capture/Verification Systems & Methods This system is primarily aimed at the electronic signature capture process to eliminate retailer paper systems and chargeback costs. It also describes a system of signature verification based upon the use of a local integrated chip card reader and signature capture pad with the biometric template stored on the chip card or on a separate remote template server. The system does not envisage the credit card issuers host storing the template, performing the signature verification or using the verification result in its credit authorization decision. Like all other prior art systems the emphasis is on the retailer merchant undertaking the verification for its purposes alone. In addition the signature rotation process, although novel at the time does not meet the test of rotating the (X,Y) data from the original signature to a consistent angle of inclination (as the present invention does). The system is also restricted to signature pads which must measure at least one set of (X,Y) coordinate values which represent stylus positions above the surface of the digitizer and the system does not describe which signature features to include in the comparison, nor how to determine them. Nor does the system describe how to calculate the signature comparison threshold values.

U.S. Pat. No. 5,680,470 (Moussa et al) Method of automated signature verification This system describes, in some detail, a method of signature verification based upon establishing templates based upon features calculated from data captured from a digitizer capable of capturing X,Y,T,S and P values. The templates are constructed using neural network methods as opposed to the present invention which develops template features from just X,Y,T data and calculates discriminant weights using statistical analysis—not neural networks—from the submitted signatures. Mousse uses a different and inferior method of rotating the signature to a consistent angle of inclination and a different method of calculating a mismatch score for the test signature against the template. Nowhere does he suggest using the signature verification result in conjunction with a neural network fraud assessment to satisfy a credit card authorization request.

U.S. Pat. No. 6,381,344 (Smithies et al) Method and system for the capture, storage, transport and authentication of handwritten signatures This and the other Smithies patents concentrate on applying signature capture and verification in the context of a party's affirmation in signing electronic documents. It does not define how the signature verification methodology works and does not rotate the signature to a consistent angle of inclination prior to signature comparison. Nor does it combine a signature mismatch score with a fraud assessment score to arrive at a credit card authorization request decision as this invention advocates.

U.S. Pat. No. 7,545,960 (Coutts) Biometric System

This system describes a biometric system for comparing a biometric sample with a biometric template and a method of determining the susceptibility of the biometric templates so generated to false acceptances. The system appears to be describing a fingerprint system although it does mention other biometric modalities such as voice prints, facial images, iris scans or finger geometry. Nowhere does it refer to signature biometrics and nowhere does it address the credit authorization process.

U.S. Pat. No. 7,263,506 (Lee, et al)—Identification and management of fraudulent credit/debit card purchases at merchant ecommerce sites This system utilizes a fraud screening system comprising the comparison of multiple transaction fields to previously stored data for the purpose of reducing online transaction fraud. This system makes no mention of the capture or use of signature data, and indeed could not do so as there is presently no method available for an online merchant to remotely capture an online purchaser's signature.

U.S. Pat. No. 7,715,600 (Avni, et al)—System for and method of web signature recognition system based on object map This system utilizes a background graphic that enables a person to be authenticated by inputting a sequence of clicks and/or mouse movements against the background graphic image. While this invention uses the term "web signature", it does not attempt nor claim to compare a person's actual real-life signature with one captured over the Internet like the present invention. Additionally, the invention does not allow for remote verification, nor combining its analysis with other fraud detection systems, nor utilizing the signature verification techniques discussed in this patent application to increase reliability and accuracy of the verification process.

Unique Aspects of the Present Invention in Light of Art References of Record

It is the opinion of the present inventors that all of the art references reviewed that relate to signature verification inventions, have approached the problem of payment card signature verification under the assumption that the present payment card issuing bank authorization process is fixed and cannot be changed. The present inventors have instead taken a broader systems approach to the problems of fraud and identity theft, and have analyzed the entire payment card business system from merchant checkout through payment card issuing bank authorization processes, and have identified a novel solution to the problem that shifts the signature verification analysis to the card issuing bank location from the merchant location. In contrast, all of the identified art as well as all of the present payment card systems that exist in all countries around the world, presently require payment card signature verification to be performed at the merchant's local POS location, and not at all for online transactions. The present payment card systems around the world all require signature verification to be done manually by a cashier, whereas some of the art reviewed adds a computer system and/or a camera to perform or assist in the signature verification process locally at the merchant's POS location. By embedding the signature feature set data into the payment card authorization process, the present inventors believe they have identified a powerful and novel approach that can be used to significantly reduce incidents of both transaction fraud and identity theft.

An example of this total business system approach can be seen in that the present invention's claims require combining POS transaction data, payment card data, and the signature feature data into the payment card authorization request. The payment card issuing bank then de-couples these data sets and remotely analyzes the components to validate both the availability of funds in a particular account, as well as the identity of the person requesting purchase authorization at point of sale. Then the payment card issuing bank utilizes a combined scoring mechanism, based on its transaction fraud analysis, as well as signature feature comparison, to determine transaction authenticity, and then combines this information with the funds availability analysis to fully authorize the POS transaction, potentially removing fraud liability from the merchant. In the present system, and in all of the previous art reviewed, the merchant is always responsible for signature verification and assumes all fraud liability should the signature be determined to be fraudulent after the transaction was completed.

BRIEF SUMMARY OF THE INVENTION

The present invention involves a method to reduce payment card industry fraud losses by electronically capturing a purchaser's signature (or sign), automatically extracting a unique set of features from the signature, and transmitting the extracted signature feature data, along with the traditional purchase authorization data, to a card issuing bank so that it can combine comprehensive credit and fraud checks with a more robust signature verification check than a merchant's cashier or any merchant based signature verification system can accomplish. The principles of Electronic Signature Capture are currently well-established and, for the most part relatively well documented. After credit card authorization (as opposed to before credit card authorization, which the present invention is advocating), POS customers write their signatures on electronic digitizers that sample the (X,Y) positions of the pen many times a second as it moves over the surface. Typically the samples are taken at a constant rate so, if required, a time value can be associated with each sampled coordinate pair. At the end of the signature the sequential in-contact (X,Y) coordinate values are associated with the authorized transaction details and fed into the retailers electronic signature capture system. This might be centered at the local retailers computer system, the retailer's HQ system or it might be provided as a service by a $3^{rd}$ party processor. Generally all the (X,Y) captured data are retained. Some systems might reduce the number of data points by, for instance, eliminating coincident consecutive (X,Y) points before storing or transmitting the data.

While the art related to signature verification and fraud prevention is voluminous, the present inventors believe that no previous public or private art has suggested remotely transmitting and combining signature feature extraction and comparison with credit risk and fraud risk analysis, to enable a payment card issuing bank to perform such a comprehensive credit authorization process including signature verification and fraud prevention.

Currently, the electronic signature does not form part of the data transmitted to the issuer to obtain the authorization for the specific transaction (see FIGS. 1 and 2). The data elements presently transmitted during a purchase authorization request are the payment card data and the purchase transaction data.

The present invention adds a third data element to be transmitted in the purchase authorization request, which is the signature feature data. These additional data can be used by the payment card issuer during its fraud screening processes, thereby improving the ability to detect fraudulent transactions. Capturing a purchaser's signature, extracting a signature feature set, appending this electronic signature feature set data to the traditional authorization data for automatic comparison by the issuer before (as opposed to after) the transaction is screened for fraud, and using these data in conjunction with credit account verification and fraud screening analyses, is the basis of the present invention. Currently the electronic signature capture and signature verification (if any) is performed after the authorization process has completed and plays no part in the purchase authorization process.

The present invention describes a system which enables functions of the electronic signature, specifically biometric signature feature data, to be extracted from the signature captured at the electronic signature capture device, after associating a further biometric aspect of the signature, for example a time component, with each sampled pen position. These data are then combined with transaction and payment card data, and transmitted to the Issuer's authorization system to be compared automatically to a comparable biometric signature template established for this particular customer by the issuer based on feature extraction. The issuer would then return an approve/decline decision, based upon the transaction data, the credit screening, the traditional fraud pattern screening, AND the signature verification analysis from the matching process. The retailer would be able to take this information into account when accepting or declining the transaction. In some cases the retailer may decide to take on the risk of a declined transaction after viewing further identification (e.g. a driver's license).

BENEFITS OF THIS INVENTION

The benefits of this system are readily apparent:
1. While the "who pays" decision has never been very clear-cut in disputed transactions where human judgment on a signature match is at issue, the present invention includes a system, based upon signature feature extraction and comparison, to enable the payment card issuer to provide an automatic decision to the retailer before the retailer accepts the transaction. This will enable both the issuer and the retailer to eliminate much of the dispute process and fraud costs associated with lost or stolen cards, to associate card transactions with a specific individual and to reduce Identity theft. It is important to note that the POS signature terminals presently being used by the industry capture the signature as a document management function alone, and not as a fraud screening tool. Thus it will be necessary to "upgrade" these POS signature terminals with new software to support the present invention as they are not designed to do anything more than simply record an image of signature should a dispute arise at a later date.
2. For most transactions the retailers sales associate is relieved of the responsibility of comparing the signature on the back of the card with that of the transaction signature.
3. Most fraudulent transactions will be caught by the signature biometric test and the issuer is then absolved from the responsibility of the fraudulent transaction by declining the authorization to the retailer.
4. The system would require no more hardware at point-of-sale than that which already exists so the retail system could commence with low cost software updates to the Signature Capture terminal (typically downloadable) and the POS terminal.

5. The system requires no additional consumer computer hardware or software to enable signature capture on online purchase transactions. Merchants would only need to modify their payment card entry screen by adding a signature box for customers to sign their receipts electronically using their computers pointing device.

6. Initially, the biometric feature data extracted by the terminal and sent to the issuer would be used by the issuer to build up a reliable signature/sign biometric template, stored securely on the issuers host and customers would experience virtually no difference in the POS signature capture transaction than they do today.

7. These data could be used to reduce the effects of Identity theft and associated fraud, much of which stems from fraudulent credit cards.

8. Adoption of the technology can be done in stages, with fraud reduction benefits accruing as penetration increases. For instance, remote upgrading of software in merchant's Signature Capture and POS terminals can be encouraged by one or more of the card networks, to support the current invention during the next POS terminal & Signature Capture terminal software upgrade cycle. Once a critical mass of POS terminals is capable of capturing signature biometrics, card issuing banks can start capturing and storing the signature biometric data for their customers. When sufficient signatures have been captured to provide a highly reliable model of a particular customers signature, the issuer can simply turn on the signature biometric screening process for that individual customer. Customers who use their cards more frequently will reach the threshold for a reliable signature model sooner than customers who use their cards less often. Customers do not need to know that a new fraud detection system is being put in place, as the only change they might notice is that they sign their receipt prior to their transaction being approved instead of after approval as is the current industry practice.

9. Since online transaction carry an identifier that indicates that a physical card swipe did not occur, the system can be easily made to create separate templates for comparing and verifying online and retail POS transactions. This will likely be important for issuers to differentiate since purchaser signatures are likely to be different when signing with a POS stylus pen at a store, versus signing with their finger or mouse during an online purchase. The system can aggregate, compare, and verify a variety of signature templates for each customer to account for a variety of ways a purchaser may sign a receipt.

It is practically possible, though maybe not desirable, with today's technology, to send the raw signature/sign (X,Y,T) data through a network to an issuer system, so that it could check the transaction, including any biometric data, which it could generate from the transmitted raw signature/sign data. In this case the issuer could satisfy the request for copy process itself and eliminate the need for individual retailers to perform this function, as well as that of generating the biometric features. This process could also be implemented with few perceived system differences by the customer.

Many POS customers, when they sign at the signature capture terminal, generate a different, shorthand sign version of their normal "authentic signature"—the authentic signature being the one they might use to sign a business letter—and it is this shorthand sign version which the biometric process needs to match. It is possible to build a signature/sign biometric template which contains both the biometric features of this shorthand sign as well as an electronic version of the customer's authentic electronic signature. If this "dual-purpose template" were stored by the issuer, the issuer would again have all the information to satisfy the request for copy by releasing the authentic signature, rather than the submitted shorthand sign to the electronic transaction receipt. The shorthand sign could then be jettisoned at the POS system after extracting the signature feature set data and the raw signature/sign data would not have to be transmitted over the network.

Should use of this invention become sufficiently widespread in the banking industry, then it should be possible for banks to offer to validate another bank's customer using the biometric signature feature set data taken on a new credit application, for any form of loan or other account beyond card products, thereby adding a strong layer of defense against identity theft more broadly across all forms of customer accounts and transactions, financial or otherwise. Such a clearing house function to validate signatures, if deployed fully, would significantly reduce identity theft.

The present invention also enables an additional application for combining signature feature extraction with credit and fraud decision analysis, which can be used to combat identity theft on newly issued credit cards. The principal lending products corrupted in identity theft cases are credit cards. Thus if a trusted third party entity were to be created to house all customer signature feature set data templates across multiple banks, or alternatively, if banks were willing to validate newly issued payment card signature feature set data with other banks, then this invention could be used to prevent identity theft by comparing signature feature set data from initial payment card purchase transactions with signature feature set data templates that had previously been captured industry-wide. Since identity thieves are able to replicate their victim's social security numbers and birth dates, they are successfully able to apply for and receive credit cards in their victim's names. However, if the present invention were widely deployed in the industry and payment card issuing banks had a method to compare initial purchase signature feature set data to all existing feature set data templates in that customer's name, then stolen identity purchases could be declined on the initial purchase transaction, effectively preventing monetary loss from identity theft.

Other Applications Beyond Payment Card Authorization

There are a variety of centralized signature verification authority applications that the present invention can be used to facilitate in addition to payment card authorizations.

One potential signature verification authority application for the present invention could be authenticating bank customers at Automated Teller Machine (ATM) locations when making cash withdrawals from their bank accounts. Typically ATM's utilize a keypad and 4 digit Personal Identification Number (PIN) to access the customer's account. However, a criminal technique known in the industry as "skimming" has recently caused fraud losses in ATM transaction to cross the $1 B per annum level. Skimming involves a criminal placing a card magnetic stripe reader over the card slot in an ATM that reads and stores the information from customers ATM cards, and the criminal also places a miniature camera somewhere nearby that is positioned such that it can capture customer PINs as they enter it on the ATM keypad. Later, the criminal retrieves the card reader and camera, recreates magnetic stripe cards containing customer account information, and uses their PIN code to gain unauthorized access to the customer accounts. It is the opinion of the inventors that the present invention would provide a much stronger level of authentication in that while a camera can record a PIN with high precision, it would be unlikely to be able to record the X, Y, and T coordinates of a customer's signature at a sufficient level of detail to allow a criminal to replicate customer X,Y, and T signature features when trying to access their accounts. To be used in this application, ATM machines would need to be redesigned to include a signature capture function, that could be used in conjunction with or in lieu of a PIN pad, and would require a software system that would manage the extraction of signature features, transmittal of the signature feature data to the centralized signature verification authority, and disperse funds only after receiving confirmation from the centralized signature verification authority that the signature was authentic.

Other centralized signature verification authority application examples include a service that can verify signatures for parties entering into a formal contract remotely, and for verifying the identity of people wishing to remotely access a network or database. What each of these applications has in common is the existence of a service provider that has previously stored templates of a customer's signature and that can be electronically queried to verify a particular customer's signature at any time.

Art References of Record

U.S. Pat. No. 5,892,824—Beatson et al
U.S. Pat. No. 5,544,255—Smithies et al
U.S. Pat. No. 5,647,017—Smithies et al
U.S. Pat. No. 5,818,955—Smithies et al
U.S. Pat. No. 6,064,751—Smithies et al
U.S. Pat. No. 6,091,835—Smithies et al
U.S. Pat. No. 7,522,060—Tumperi
U.S. Pat. No. 7,604,169—Demere
U.S. Pat. No. 7,545,960—Coutts
U.S. Pat. No. 6,873,715—Kuo
U.S. Pat. No. 5,559,895—Lee
U.S. Pat. No. 6,715,672—Tetro
U.S. Pat. No. 7,389,269—Robinson
U.S. Pat. No. 7,120,607—Bolle
U.S. Pat. No. 6,836,554—Bolle
U.S. Pat. No. 7,451,481—Bauer
U.S. Pat. No. 5,910,988—Ballard
U.S. Pat. NO. 6,032,137—Ballard
U.S. Pat. No. 6,539,363—Allgeier et al
U.S. Pat. No. 7,136,841—Cook
U.S. Pat. No. 6,853,987—Cook
U.S. Pat. No. 5,680,470—Moussa et at
U.S. Pat. No. 7,263,506—Lee (Fair Isaac)
U.S. Pat. No. 7,801,828—Candella et al
U.S. Pat. No. 7,797,549—Main et al
U.S. Pat. No. 7,793,106—Bugbee
U.S. Pat. No. 7,792,286—Futa et al
U.S. Pat. No. 7,775,440—Silverbook, et at
Patent Application # 20020138351 Houvener et al
Patent Application # 20100082490 Roseblatt et al
Dynamic Signature Verification in Personal Identification (Beatson)
4th Worldwide Congress on Computer & Communications Security, Paris 1986.

BRIEF DESCRIPTION OF THE DRAWINGS

FIG. 1: Overview of current payment card industry authorization processes
FIG. 2: Preferred embodiment of present invention in payment card authorization application
FIG. 3: Constructing an initial template using biometric feature extraction
FIG. 4: Using templates for signature verification once sufficient template data is captured

DETAILED DESCRIPTION OF THE INVENTION

FIG. 1 illustrates the current payment card industry processes for authorizing purchases. The numbered process steps relate to the numbered boxes in FIG. 1, and correspond to the human and/or system tasks performed in each step of the current industry processes for authorizing payment card transactions:

Process 101: A customer brings products to be purchased to a cashier at retail store, or visits the checkout screen for a merchant's online store, to initiate the checkout process.

Process 102: Once the purchase prices of the items have been totaled, the customer provides his or her payment card information to the merchant via a variety of data transfer mechanisms, including but not limited to:
sliding a payment card through a magnetic stripe card reader system
manually entering information into a screen on a merchant's online store
transferring information wirelessly via a handheld mobile device such as a phone
passing a payment card with an embedded Near Field Communication (NFC) system identifier embedded over a merchant NFC reader Process 105: The payment card data that is captured by the merchants systems typically includes at least four data elements:
the payment card owner's name
the payment card account number
the payment card expiration date
one or more payment card security codes stored on the magnetic stripe and/or printed/embossed on the payment card
email address (if online purchase)

Process 106: The purchase transaction data is then extracted from the merchant's checkout system, which may include, but is not limited to:
merchant and store identifier codes
amount of purchase to be authorized
date and time of transaction
billing and shipping address (if purchase is to be shipped)

Process 107: The merchants system then transmits an authorization request to the payment card processor, which includes the purchase transaction data and the payment card data.

Process 108: The merchant's payment card processor makes a record of the authorization request and then forwards the authorization request to the appropriate payment card network processor (e.g. Visa, MasterCard, American Express, Discover).

Process 109: The payment card network processor typically runs a transaction fraud screen on the authorization data, intended to identify purchase requests being made by known stolen or fraudulent payment card account numbers. The payment card network processor makes a record of the authorization request and then forwards the authorization request to the appropriate payment card issuer.

Process 110: The payment card issuer separates the authorization request data into its constituent parts (i.e. purchase transaction data, payment card data) and formats the data for use in the payment card issuers proprietary account verification and fraud screening processes.

Process 111: The payment card data is used to verify that the payment card account is in good standing, and the amount of purchase is compared to the payment card account's purchasing capacity to verify whether the transaction can be approved from an account standpoint. The results of these verifications are then passed to the approve/decline decision process.

Process 113: The payment card data and purchase transaction data are both screened for possible fraud risk. Typically this is done using a neural network that has been coded to analyze both merchant and payment card account patterns as it searches for unusual patterns or known historical fraudulent usage patterns. A pass-fail or fraud risk score is then passed to the approve/decline decision process.

Process 114: The payment card issuer determines whether to approve or decline the purchase authorization request. The majority of these decisions are fully automated and are based on rules previously set up by the payment card issuer. In some instances, such as an unusually large purchase amount, a payment card issuer may utilize human underwriters to review the results of both the fraud screening and account verification prior to approving or declining a particular transaction.

Process 115: The payment card issuers approve/decline decision is then sent back to the merchant via the payment card network processor and the merchants payment card processor. If the authorization request is declined, the payment card issuer typically provides a reason code for the decline (e.g. insufficient funds, address mismatch, stolen card).

Process 116: If the authorization was approved, the merchant informs the purchaser that the sale is now complete. If the authorization was declined, the merchant has the option to review the decline reason code and proceed with the transaction, but in this scenario, the merchant would be fully liable for any non-payment by the customer for this transaction. Typically merchants exclusively follow the approve/decline decision of payment card issuers, however some merchants routinely override decline decisions and proceed with the sale anyway (e.g. online software merchants which have zero marginal cost of goods sold often take such risks).

Process 117: The customer signs the receipt if the purchase was made in a retail store, and takes their merchandise. This receipt can be either a physical receipt, created by ink-on paper, or it could be an electronic receipt from an electronic signature capture terminal. In either event, the signature information is captured after the transaction has been approved, and after all of the fraud screening processes have been applied to the various data components of the traditional authorization data. For online purchases, there is no signature required on a receipt and the merchant typically emails a copy the receipt to the purchasers supplied email address.

Since the early 1990's there has been a significant increase in the number of Electronic Signature capture terminals situated at Point-of-Sale (POS). These terminals have been introduced from about 1993 to enable retailers to automatically satisfy requests for copy from the issuers when a transaction is disputed by a customer. The terminals enable these requests for copy to be satisfied electronically and thereby save the retailers millions of dollars in time, and costs associated with the need to store and retrieve the paper copies of credit card receipts. These electronic systems not only save millions of dollars in labor, storage and retrieval costs, they also save a similar amount in chargebacks. Issuers and acquirers charge the value of a transaction back to the retailer in the event the retailer is unable to satisfy a request for copy caused by a disputed transaction from the customer. Typically the electronic signature is captured by repeated sampling of the pen position as a customer signs on one of these electronic signature capture terminals, using the data to form a vectored image of the customer's captured signature. These data are then associated with the credit card transaction data and communicated to and stored by the retailer or by a third party processor providing that service on behalf of the retailer. The request for copy is satisfied by retrieving the transaction details and the associated electronic signature and then printing/faxing/transmitting a record of the POS transaction with the signature in place, to the issuer, who sends the details to the customer as evidence of the transaction. If there is some doubt as to the authenticity of the signature, the retailer, whose sales associate is supposed to check the customer's signature on the back of the card but seldom does so, and the issuer agree who should stand the cost of the fraud.

DESCRIPTION OF PREFERRED EMBODIMENTS

Preferred Embodiment of the Invention in Payment Card Authorization (FIG. 2)

FIG. 2 illustrates the preferred embodiment of the present invention which provides superior fraud detection and prevention performance for the payment card industry authorization processes. The following steps describe processes that occur in each corresponding box number as defined in FIG. 2.

Process 201: A customer brings products to be purchased to a cashier at retail store, or visits the checkout screen for a merchant's online store, to initiate the checkout process.

Process 202: Once the purchase prices of the items have been totaled, the customer provides his or her payment card information to the merchant via a variety of data transfer mechanisms, including but not limited to:
sliding a payment card through a magnetic stripe card reader system
manually entering information into a screen on a merchant's online store
transferring information wirelessly via a handheld mobile device such as a phone
passing a payment card with a embedded Near Field Communication (NFC) system identifier embedded over a merchant NFC reader Process 203: The customer signs an electronic signature capture device, which captures (X,Y,T) data from sequentially sampled pen positions as it moves over the signature capture device. The signature capture device can include but is not limited to the following device types:
an electronic signature pad in a retail store
an area on an online merchant's checkout screen designated for a customer to provide their signature via a pointing device such as a mouse, a stylus, a finger moving on a mousepad, or a finger moving on a laptop touchscreen
an area on a handheld mobile device designated for customers to provide their signatures via a pointing device such as a stylus, a trackball, a finger moving on a mousepad, or a finger moving on a touch screen An important distinction of the present invention is that it requires signature capture prior to a payment card authorization request being sent to a payment card issuing bank, whereas the present state-of-the-art and all art reviewed capture the signature after the purchase authorization request is approved by a payment card issuing bank.

Process 204: Signature feature data is extracted from the captured electronic signature using a Dynamic Signature Verification (DSV) technology. The preferred embodiment of a DSV system used in the current invention involves capturing X and Y coordinates of the signature as well as timing elements, and rotating the signature to a consistent angle of inclination prior to extracting features. See Processes 306, 309 and 401 in FIGS. 3 & 4, which are described later for a more detailed description of the preferred embodiment of the DSV system.

Process 205: The payment card data that is captured by the merchant's systems typically includes at least four data elements:
the payment card owner's name
the payment card account number
the payment card expiration date
one or more payment card security codes stored on the magnetic stripe and/or printed/embossed on the payment card
email address (if online purchase)

Process 206: The purchase transaction data is then extracted from the merchant's checkout system, which may include, but is not limited to:
merchant and store identifier codes
amount of purchase to be authorized
date and time of transaction
billing and shipping address (if purchase is to be shipped)

Process 207: The merchants system then transmits an authorization request to their payment card processor, which includes the purchase transaction data, the payment card data, and the signature feature data.

Process 208: The merchant's payment card processor makes a record of the authorization request and then forwards the authorization request to the appropriate payment card network processor (e.g. Visa, MasterCard, American Express, Discover).

Process 209: The payment card network processor typically runs a transaction fraud screen on the authorization data, intended to identify purchase requests being made by known stolen or fraudulent payment card account numbers. The payment card network processor makes a record of the authorization request and then forwards the authorization request to the appropriate payment card issuer.

Process 210: The payment card issuer separates the authorization request data into its constituent parts (i.e. purchase transaction data, payment card data, signature feature data) and formats the data for use in the payment card issuer's proprietary account verification, fraud screening, and dynamic signature verification processes.

Process 211: The payment card data is used to verify that the payment card account is in good standing, and the amount of purchase is compared to the payment card account's purchasing capacity to verify whether the transaction can be approved from an account standpoint. The results of these verifications are then passed to the approve/decline decision process.

Process 212: The signature feature data is compared to a previously stored template of the customer's signature features, and a signature mismatch score is generated—see FIG. 4, Process 401. The detailed methodology is described later.

Process 213: The payment card data and purchase transaction data are both screened for possible fraud risk. Typically this is done using a neural network that has been coded to analyze both merchant and payment card account patterns as it searches for unusual patterns or known historical fraudulent usage patterns. The fraud likelihood score from this process is then combined with the mismatch score from the DSV process to generate a combined pass-fail or fraud risk score and this is then passed to the approve/decline decision process.

Process 214: The payment card issuer determines whether to approve or decline the purchase authorization request. The majority of these decisions are fully automated and are based on rules previously set up by the payment card issuer. In some instances, such as an unusually large purchase amount, a payment card issuer may utilize human underwriters to review the results of both the fraud screening, dynamic signature verification mismatch score, and account verification prior to approving or declining a particular transaction.

Process 215: The payment card issuer's approve/decline decision is then sent back to the merchant via the payment card network processor and the merchant's payment card processor. If the authorization request is declined, the payment card issuer typically provides a reason code for the decline (e.g. insufficient funds, address mismatch, stolen card). At least one new reason code (e.g. signature mismatch) would likely be generated to account for the expanded reasons why a purchase authorization could be declined.

Process 216: If the authorization was approved, the merchant informs the purchaser that the sale is now complete. If the authorization was declined, the merchant has the option to review the decline reason code and proceed with the transaction, but in this scenario, the merchant would be fully liable for any non-payment by the customer for this transaction. Typically merchants exclusively follow the approve/decline decision of payment card issuers, however some merchants routinely override decline decisions and proceed with the sale anyway (e.g. online software merchants which have zero marginal cost of goods sold often take such risks). In the event of a signature mismatch being the reason for the decline, a merchant might wish to ask the customer to sign the signature capture device again and then resubmit the purchase authorization request with newly generated signature features. Alternatively, the merchant might ask to see the customer's Drivers License before coming to a decision.

Signature/Sign Verification Based on Feature Extraction, Template Building and Matching There has been much attention given to signature/sign biometrics in the last six or seven years and one of the issues which has mitigated against a solution such as this is that different retailers purchase their signature capture terminals from different vendors so that there is little consistency in terms of image quality, resolution or sampling rate. There are now international standards in place for signature/sign biometric data formats, see ISO/IEC JTC1 SC-37 19794, parts 7 and 11. These standards can work to standardize the Signature Capture terminals to deliver data to a minimum base standard for the generation of signature/sign biometric data, including the necessary X, Y and T (time) data. The standards refer to a minimum of (X,Y,T) data and set minimal standards for resolution (number of dots per centimeter), jitter (a measurement of the co-ordinate "noise") and linearity (how consistent is the resolution across the surface of the digitizer).

An important part of this invention is to transform the originally captured (raw) signature/sign data from the electronic signature capture terminal, in a manner that minimizes biometric feature data variations associated with different signature capture terminals and different angles of submission. This includes but is not limited to;

1) Associating a time value with each X,Y coordinate pair
2) Rotating the original (X,Y) signature capture values to a consistent angle of inclination
3) Extracting common feature values which have been transformed to reduce the effect of different digitizer resolutions and sampling rates.
4) Ensuring that some of the features are compatible with similar features extractable from a scanned image of a signature/sign written on paper.
5) Recognizing that the signature/sign biometric modality is behavioral in nature and therefore the biometric template values must be defined not only by their means but also by a measurement of their deviations from those means.
6) Utilizing a simple but effective template creation and update process that uses as few signature/signs as necessary to form the initial biometric template and to update it over time.
7) Including the authentic electronic signature as well as the biometric feature values in a dual purpose customer template. The authentic signature could then be used to satisfy the request for copy.
8) Utilizing an efficient matching process that reflects the discriminating power of each biometric feature and allocates discriminating weights for appropriate features included in the chosen set.
9) Combining the biometric (mis)match score with the fraud analysis score in a manner that maximizes discrimination between authentic and fraudulent transactions.

Building the Templates, Extracting Features and Matching the Biometric Samples to the Templates.

In an exemplary system the biometric template is first created and updated by the Issuer's computer after receiving a number of relevant biometric samples from (probably different) retailer systems. Thereafter the retailers signature capture system and signature/sign biometric feature extraction system is used with the issuer's biometric template maintenance and matching system to generate signature/sign (mis)match scores.

The first task is to build a reliable template against which to match future biometric samples. FIG. 3 describes this process to provide the signature/sign biometric template necessary to accomplish the DSV Processes in boxes 204 and 212 in FIG. 2.

Turning to FIG. 3, we start with the process of installing special software (box 301) in the signature capture devices to capture the time element (T) associated with each (X,Y) sample point, to rotate these X,Y points to a consistent angle of inclination and to extract predetermined features of these rotated data. The POS terminal software is amended (box 302) to deal with these extra data and the Merchant Card Processor and Payment Card Network Processor—see FIG. 2 (boxes 208 and 209) will also need to amend their processes to deal with the extra data. The method of rotation used to generate a consistent angle of inclination is described below:

Referring to FIG. 3 (box 306) the (X,Y) data from the signature capture device is transformed to a consistent angle of inclination by applying a quadratic equation in 1) a ratio of (X,Y) variances and 2) a covariance of the (X,Y) data, such that the resulting transformed (x,y) coordinates are invariant to the original angle of submission of the signature. Following this the transformed data may be further rotated based upon applying a rotation calculated from the tangent of a line of regression calculated on the rotated data. Although the system may choose to use one or the other of two possible quadratic equations for the initial rotation, the equation chosen in this exemplary system defines the transformation angle through which to rotate the original X,Y axes as $\mathrm{Tan}^{-1}(M)$, where:

$M=[2ra+\text{or}-\mathrm{Sqrt}(4r^2a^2+a^4-2a^2+1)]/(a^2-1)$ if a is not equal to 1, and where $a=\mathrm{Sqrt}[V(X)/V(Y)]$ with $V(X)$ and $V(Y)$ being the well known definitions of the variance of the (X,Y) data. r is the well known definition of the correlation coefficient of the (X,Y) data.

When a approximates 1, the value of IMI becomes very large and for this reason it is advisable to limit the value. A value of 10,000 works relatively well.

Although both the positive and the negative square roots of the equation will achieve the desired effect, they will provide different rotation solutions. There is no particular advantage to choosing one over the other and the negative square root option will be assumed. This rotation will always transform the original (X,Y) pixel positions to a consistent angle of inclination with respect to the rotated (x,y) axes. The transformed (x,y) data may then be further rotated through an angle calculated as the angle between a line of regression through the (x,y) data and the x axis. The resulting image might then be more representative of a natural angle of submission and is also corrected for skew. The line of regression of choice may be that derived by minimizing the sum of the squared perpendicular distances from the (x,y) points to the line of regression and this is achieved by solving the equation:

$2m^3-m^2(2r_1+1)+2m(r_1+1)-(2r_1+1)=0$, where m is the tangent of the angle between the line of regression and the x axis and $r_1$ is the correlation coefficient of the (x,y) data and can be calculated as:

$$r_1=[M(1-a^2)+(1-M^2)ra]/[a^2+2mra+M^2]$$

The combined rotational transformation angle can then be calculated from the original X,Y data by the well-known equation:

$$M_1=(M+m)/(1-Mm).$$

The final transformation may then be calculated by applying the following transformation to the original X,Y axes to generate the finally transformed (x,y) data from the original (X,Y) data:

x=Xcos w+Ysin w
y=Ycos w−Xsin w
where tan w=$M_1$

This transformation has a very significant beneficial effect on the consistency of feature extraction thereafter and leads to a significantly higher performance biometric system, with lower False Reject and False Accept rates Dynamic Signature Verification 1) Template Building—see FIG. 3—processes 306 and 309: After installing the template building and matching software on the Issuer's host (box 302) an exemplary system of the present invention would build the template on the Issuer's system from customers' signatures shortly after they are submitted. The Electronic Signature capture terminals will have been modified (box 301), from a software perspective, to extract biometric features from the raw signature/sign data after allocating a time value to each (XY) coordinate value and the POS terminal will have been modified to accept and transmit these feature values through the network to the Issuer with the account data and the transaction details. In the current invention, the DSV software would transform the (X,Y, T) values by rotating them to a consistent angle of inclination, generating (x,y,t) values as described earlier and then:

a) Extract m features of the (x,y,t) data, $(f_1 \ldots f_m)$ in a manner later described (Box 306)

b) Transmit these values with the account and transaction data through the network to the Issuer.

The issuer system (Box 309) will, for the first N signatures for each customer, calculate and store the mean value for each of the features calculated so that if $f_{1j}$ is the $j^{th}$ value of feature 1 (from the $j^{th}$ signature for a specific customer) then—: Mean $f_{1j}=Mf_{1j}$; would be calculated as follows:

$Mf_{11}$ after 1 signature=$f_{11}$
$Mf_{12}$ after 2 signatures is $((1-a)*Mf_{11}+a*f_{12})$
$Mf_{13}$ after 3 signatures is $((1-a)*Mf_{12}+a*f_{13})\ldots$ etc.
Where:
for the second signature a=0.5
for the third signature a=0.33
for the $4^{th}$ signature a=0.25 . . . etc
for the $n^{th}$ signature a=1/n until n=9. Thereafter a=0.1 for all signatures.
$Mf_2 \ldots Mf_m$ will be calculated in a similar manner The issuer system will also calculate and store the mean difference of the feature values from their means as each new signature is submitted in the following manner.

If the mean difference for feature 1 after j−1 signatures is $D_{1j-1}$, then:

$D_{1j}=a*Abs(f_{1j}-Mf_{j-1})+(1-a)*Abs(D_{1j-1})$ where a has the values:
for the second signature a=0.5
for the third signature a=0.33
for the $4^{th}$ signature a=0.25 . . . etc.
for the $n^{th}$ signature a=1/n until n=9. Thereafter a=0.1 for all signatures.
$Df_2 \ldots Df_m$ will be calculated in a similar manner.

As each new signature/sign is added, after the first two, a compatibility test may be applied to the M values to determine if they are consistent with the previous M and D values and if not that signature may be eliminated.

The new mean estimates (M) of feature values and their differences (D) will be stored as the feature template values for that feature and will be used in the matching calculation. After the system starts to match each new signature/sign with its template values the mean and mean differences will be updated in the same way after each good match.

How large should N be?

In some systems with proper screening of the early signatures, matching can take place after as few as three signatures. However, since the signatures are likely to have been generated on significantly different electronic signature capture terminals an exemplary system would capture about 10 signature/signs before defining the template.

2) Feature Extraction (Process 306)

In an exemplary system we envisage the features being selected using one or more functions of the transformed (x,y, t) data as described below:

a. V(x), where V(x) is the variance of the x-coordinate values of the transformed signature.

b. V(y) where V(y) is the variance of the y-coordinate values of said transformed signature.

c. C(x,y) where C(x,y) is the covariance of the transformed signature coordinate values d. Total signature time.

e. Total in-contact signature time f. Total out-of contact signature time g. Positions of (x,y) turning points with respect to time h. Positions of (x,y) turning points with respect to x-position i. Positions of (x,y) turning points with respect to y-position j. An estimate of total x-distance traveled k. An estimate of total y-distance traveled l. (x,y) positions of new points of stylus contact with respect to time m. New out-of-contact stylus (x,y) positions with respect to x-position n. (x,y) positions of new points of stylus contact with respect to x-position o. (x,y) positions of new out-of-contact stylus positions with respect to time p. Forehand (x,y) distances q. Backhand (x,y) distances Forehand movements of the stylus are defined when the x movement and the y movement are either both positive or both negative. Backhand movements of the stylus are defined when the x movement is positive and the y movement negative, or vice-versa.

To arrive at an efficient feature set and discriminant weights $(w_i)$ that discriminate powerfully between authentic signatures and fraudulent signatures the inventors advocate the method defined in the white paper authored by Rodney Beatson—one of the present inventors—entitled Feature Selection & Definition in a Biometric System with Many Possible Features Including Multi-Modal Features dated Feb. 8, 2010 and incorporated herein by reference.

The credit card authorization and signature verification method used to generate the authorization request, described by this invention is given extra strength by the signature verification accuracy observed in a limited experiment conducted on behalf of the INCITS Biometrics M1 committee. The sign data captured in this experiment was later subjected to the analysis described above, in the white paper, with impressive results.

3) Feature Matching—see Process 401 in FIG. 4

After template building is complete, the new authorization process, including the biometric matching process can begin and FIG. 4 describes this process which completes the DSV process in Box 212 of FIG. 2.

Turning to FIG. 4—Process 401

Suppose that, for a particular signature the value of feature i is $f_i$.

Suppose the template values for feature i are $M_i$ and $D_i$

We calculate a mismatch score sum=S=Sum(Abs($f_i-M_i$)/$D_i$) for i=1 . . . m, where there are m feature values being measured.

This can be compared against a threshold value $T_m$ to generate a match or a mismatch. The template values would be updated for a match and not for a mismatch.

There are many different ways to calculate mismatch distance measurements of this nature and we encompass them generally in this example.

4) Calculating $T_m$

There are m features with discriminant weightings $(w_1 \ldots w_m)$, with Sum($w_i$)=m, contributing to the mismatch score and the value of $T_m$ can be set as follows:

$T_m$=Sum($w_i$)+p*sqrt(Sum($w_1^2$))—where p is a parameter used to set the security level. The lower the value of p, the more secure is the system and vice versa. The higher the value of p, the more benign is the system and vice versa.

Combining Fraud Screening Scores with Signature Verification Mismatch Scores

There are a number of ways in which the fraud screening scores can be combined with the signature verification scores but for maximum effect the signature verification Mismatch scores need to be (and are)indicative of the probability that the submitted signature is fraudulent. After that discriminant weightings applied to the current fraud screen score and the signature Mismatch score should be used. This could be of the form; W1*S+W2*M where S is the current fraud screen score, M is the signature Mismatch score and W1 and W2 are calculated as described in the document entitled "Feature Selection & Definition in a Biometric System with Many Possible Features Including Multi-Modal Features dated Feb. 8, 2010"

What is claimed is:

1. A payment authorization system comprising:
   a) a first computer system and software comprising:
      i) an electronic payment processing system incorporating software; a method for capturing data from the purchaser's payment account; a method for capturing purchase transaction data; and a method of capturing an electronic copy of a purchaser's signature;
      ii) the capture of purchaser's signature data from an electronic signature entry system; the generation of signature feature set data from said purchaser's signature data;
      iii) the capture of said purchaser's payment account data, including said payment account number;
      iv) the capture of transaction data, including transaction amount and merchant identifier;
      v) the transmission of the said signature feature set data, said account data and said transaction data to said purchaser's payment account issuing bank as a purchase authorization request;
      vi) and the receipt from said purchaser's payment account issuing bank of the result of said purchase authorization request;
   b) a second computer system and software located at said purchaser's payment account issuing bank location that receives said purchase authorization request and
      i) automatically separates out said signature feature set data, said account data, and said transaction data into its constituent components;
      ii) automatically performs a signature match calculation by comparing said purchaser's signature feature set data with a previously stored signature template created from previous signature feature data sets from said purchaser; and generates one or more signature feature set data mismatch scores from said match calculation that is indicative of the likelihood that the signature is either authentic or fraudulent;
      iii) automatically analyzes said transaction data and said account data with pattern recognition software and/or fraud database analyses to identify high fraud risk transactions, and uses these analyses to generate one or more transaction fraud risk scores associated with the purchase request;
      iv) automatically screens account data to identify high credit risk transactions, including but not limited to verifying that said purchaser's payment account is in good standing and has sufficient purchasing capacity to approve said transaction amount;
      v) automatically approves said purchase authorization request responsive to:
         (1) said signature feature set data mismatch score being within a pre-determined acceptable range that would suggest the signature is authentic;
         (2) said transaction fraud risk score being within a pre-determined acceptable range that would suggest the transaction is not fraudulent; and
         (3) said account being in good standing and with sufficient purchasing capacity to support the purchase request;
      vi) either automatically or after human review, declines said purchase authorization request responsive to one or more of the following:
         (1) said signature feature set data mismatch score being outside of a pre-determined acceptable range that would suggest the signature may be a forgery;
         (2) said transaction fraud risk score being outside of a pre-determined acceptable range that would suggest the transaction may be fraudulent; or
         (3) said account not being in good standing;
         (4) said account having insufficient purchasing capacity to support the purchase request;
      vii) automatically transmits said purchase authorization request result to said first computer system.

2. The system of claim 1 where the electronic signature entry system is a Point-Of-Sale signature entry terminal.

3. The system of claim 1 where the electronic signature entry system originates as a signature area on a merchant's online store checkout screen and requires customer to sign said signature area using one of: a mouse, a stylus moving on mousepad, a finger moving on a mousepad, a finger moving on a touchscreen, a stylus moving on a touchscreen, and other computer pointing devices.

4. The system of claim 1 where the electronic signature entry system originates as a screen on a mobile device.

5. The system of claim 1 where the said transmissions are encrypted.

6. The system of claim 1 where the said signature feature set data has been developed from the purchaser's (X,Y,T) signature data.

7. The system of claim 1 where the said signature feature set data has been developed from the said purchaser's (X,Y,T) signature data after transforming said purchaser's signature to a consistent angle of inclination with respect to predetermined axes of an orthogonal coordinate positioning system, generating new data (x,y,t) from the said (X,Y,T) data.

8. The system of claim 7 where the said signature template contains mean estimates of the said biometric feature values calculated from different samples of the said signature feature set data.

9. The system of claim 8 where the said signature template contains estimates of deviations from the said biometric feature means calculated from different samples of said signature feature set data.

10. The system of claim 9 where the said match calculation measures the distance of each said biometric feature value from its said signature template mean value in relation to said signature biometric template estimate of deviation from said biometric feature mean estimate.

11. The system of claim 10 where the said biometric feature distances are modified with discriminating weights prior to being combined to produce at least one said signature feature set data mismatch score.

12. The system of claim 7 where the said signature feature set data includes functions of at least one of the following:
   a) $V(x)$, where $V(x)$ is the variance of the x-coordinate values of said transformed signature, b) V(y) where V(y) is the variance of the y-coordinate values of said transformed signature,
c) C(x,y) where C(x,y) is the covariance of the (x,y) coordinate values of said transformed signature,
d) Total signature time,
e) Total in-contact signature time,
f) Total out-of contact signature time,
g) Positions of (x,y) turning points with respect to time,
h) Positions of (x,y) turning points with respect to x-position,
i) Positions of (x,y) turning points with respect to y-position,
j) An estimate of total x-distance distance traveled,
k) An estimate of total y-distance traveled,
l) (x,y) positions of new points of stylus contact with respect to time,
m) New out-of-contact stylus (x,y) positions with respect to x- position,
n) (x,y) positions of new points of stylus contact with respect to x-position
o) New out-of-contact stylus (x,y) positions with respect to x-position,
p) Forehand (x,y) distance, and
q) Backhand (x,y) distances.

13. The system in claim 1 where the said capture of customer's signature represents sufficiently well-defined sample values, of sufficient quality to be represented by a recognizable printed signature constructed from them on a document containing data from the said account data and the said transaction data.

14. The system of claim 1 where the said signature biometric template is a dual purpose template and contains the said data representing the authentic signature of said purchaser as well as said signature feature set data.

15. The system in claim 1 where said signature feature set data is generated from said purchaser's signature, which is a sign, different from said authentic signature of said purchaser.

16. The system of claim 1 where said signature feature set data mismatch scores, said credit risk scores and said fraud risk scores are combined to arrive at said purchase authorization request result.

17. The system of claim 1 where a trusted third party performs the match calculation on said purchaser's signature feature set data using a previously stored signature template created from previous signature feature data sets from said purchaser.

18. A centralized signature verification authority system comprising:
  a) a computer system and software at a company or individual's location where a customer signs a document, comprising:
    i) a method to capture an electronic signature from a customer using an electronic signature entry system; the generation of a set of signature feature data from said signature;
    ii) the capture of a customer identification data set provided by a centralized signature verification authority;
    iii) the transmission of said signature feature data set and said customer identification data set to a centralized signature verification authority as a signature verification request; and
    iv) the receipt from said trusted centralized signature verification authority of the result of said centralized signature verification authority signature verification request;
  b) a second computer system and software located at said centralized signature verification authority's location, which is physically separated from the location where said customer signs said document, comprising:
    i) means for accepting said signature verification request;
    ii) means for matching the customer's identification data to an existing signature feature set template for that applicant stored in a database;
    iii) means for performing a match calculation from said signature feature set data received in the signature verification request with said existing signature feature set template for that customer;
    iv) means for determining whether said match calculation suggests that the customer's identity is authentic based on the signature feature set data comparison with said signature feature set template;
    v) means for combining the result of the signature feature set match with existing fraud screening methods in effect; and
    vi) means for providing the result of the said signature feature set data comparison to the company or individual requesting signature verification.

19. The system in claim 18 whereby the system is used as an identity theft prevention system that verifies the identities of new loan applicants prior to a bank approving a loan application.

20. The system in claim 18 whereby the system is used as an Automated Teller Machine (ATM) customer identity verification system.

* * * * *